(12) United States Patent
Malinovsky

(10) Patent No.: US 7,899,092 B2
(45) Date of Patent: Mar. 1, 2011

(54) FAST QUANTUM GATES WITH ULTRAFAST CHIRPED PULSES

(75) Inventor: Vladimir Malinovsky, Clifton, NJ (US)

(73) Assignee: MagiQ Technologies, Inc., Somerville, MA (US)

(*) Notice: Subject to any disclaimer, the term of this patent is extended or adjusted under 35 U.S.C. 154(b) by 377 days.

(21) Appl. No.: 12/154,230

(22) Filed: May 21, 2008

(65) Prior Publication Data

US 2008/0291946 A1 Nov. 27, 2008

Related U.S. Application Data

(60) Provisional application No. 60/931,175, filed on May 22, 2007.

(51) Int. Cl.
*H01S 3/30* (2006.01)
*H01S 3/10* (2006.01)

(52) U.S. Cl. .......................... 372/8; 372/25

(58) Field of Classification Search .............. 372/8, 372/25
See application file for complete search history.

(56) References Cited

U.S. PATENT DOCUMENTS

| | | | |
|---|---|---|---|
| 5,233,242 | A | 8/1993 | Murphy et al. |
| 7,203,715 | B2 | 4/2007 | Rizzotto et al. |
| 7,359,928 | B2 | 4/2008 | Porto et al. |

OTHER PUBLICATIONS

Barenco et al., "Elementary Gates for Quantum Computation," Phys. Rev. A., vol. 52, No. 5 Nov. 1995 pp. 3457-3467.
Monroe et al., "Demonstration of a Fundamental Quantum Logic Gate," Phys. Rev. Lett. vol. 75, No. 25 Dec. 18, 1995 pp. 4714-4718.
Cirac et al., "A Scalable Quantum Computer With Ions in an Array of Microtraps," Nature vol. 404 Apr. 6, 2000 pp. 579-581.
Malinovsky et al., "Efficiency and Robustness of Coherent Population Transfer With Intense, Chirped Laser Pulses," Phys. Rev. A., vol. 63 2001.
Mintert et al., "Ion-Trap Quantum Logic Using Long-Wavelength Radiation," Phys. Rev. Lett. vol. 87, No. 25 Dec. 17, 2001.
DeMille, "Quantum Computation With Trapped Polar Molecules," Phys. Rev. Lett. vol. 88, No. 6 Feb. 11, 2002.
Kielpinski et al., "Architecture for a Large-Scale Ion Trap Quantum Computer," Nature vol. 417 Jun. 13, 2002 pp. 709-711.

*Primary Examiner*—Armando Rodriguez
(74) *Attorney, Agent, or Firm*—Opticus IP Law PLLC

(57) ABSTRACT

Apparatus and methods of performing fast single-qubit quantum gates using ultrafast femtosecond frequency chirped laser pulses are disclosed. The use of chirped pulses removes the demanding restrictions of prior art approaches and allows for the construction of fast quantum gates that operate at speeds on the of order several picoseconds. The apparatus includes two synchronized lasers (pump and Stokes) used to manipulate a qubit wave function in a select manner. Each laser system generates a train of optical pulses. Pulse pickers choose pump and Stokes pulses, which propagate though respective pulse shapers that apply necessary time-dependent phases. To achieve complete overlap between the pulses in time domain, necessary adjustments can be made by using an additional time delay line, which can be located in any path or in both paths.

20 Claims, 11 Drawing Sheets

FAST QUANTUM GATES WITH ULTRAFAST CHIRPED PULSES

CLAIM OF PRIORITY

This application claims the benefit of priority under 35 U.S.C. §119(e) of U.S. Provisional Application Ser. No. 60/931,175, entitled "Fast quantum gates with ultrafast chirped pulses" filed on May 22, 2007, which application is incorporated by reference herein.

FIELD OF THE INVENTION

The present invention relates to quantum computing and in particular to fast quantum gate operation.

BACKGROUND ART

Linear chirped pulses in a Raman excitation scheme give a possibility to selectively excite only one target qubit in a quantum register without disturbing its neighbors. Selectivity is guaranteed by adiabaticity of the pulse excitation which allows manipulation by only resonant qubit and leaving all other qubits unperturbed.

Intense femtosecond pulses are used to carry out the proposed scheme. The large band-width of the pulse provides the necessary flexibility to manipulate a qubit by frequency components and to apply a time-dependent phase on the pulse. The high intensity of the femtosecond laser pulses provides enough power to maintain the high Rabi frequencies necessary for high-speed quantum gates.

Many approaches to forming quantum computers require selectively addressing one particular qubit in a quantum register without disturbing its neighbors. Strong focusing such that the laser beam does not disturb the neighboring qubits has to be applied to overcome this problem using laser radiation. In other words, the spatial extent of the beam has to be less than the distance between neighboring qubits. Another approach uses the frequency-selective excitation of the quantum register qubits, which can be achieved by making transition frequencies of the qubits sufficiently different. This can be done, for example, by using a "gradient trap" such as by applying gradient magnetic field to a spin-based quantum register or by applying a gradient electric field to properly trapped polar molecules or ions.

The requirement of selectively exciting only a single target qubit in a quantum register using transition frequency differences between neighboring qubits removes focusing difficulties. However, this restricts the intensity of the external fields. The Rabi frequency of the corresponding transition has to be much smaller than the difference in the transition frequencies between neighboring qubits. In turn, this requires a strong gradient in the external magnetic or electric field, which might be difficult to realize experimentally. Reducing the pulse intensity makes the Rabi frequency smaller; however, it slows gate operations. In short, both proposed methods place additional restrictions on the physical implementation of quantum gates, and make it difficult to find a suitable quantum system for a quantum register.

SUMMARY OF THE INVENTION

Aspects of the invention include apparatus for and methods of performing fast single-qubit quantum gates using ultrafast femtosecond frequency chirped laser pulses. The qubits can be ions, molecules or like systems having quantum energy levels. The use of chirped pulses removes the demanding restrictions of prior art approaches and allows for the construction of fast quantum gates that operate at speeds on the of order several picoseconds. The apparatus includes two synchronized lasers (pump and Stokes) used to manipulate a qubit wave function in a select manner. Each laser system generates a train of optical pulses. Pulse pickers choose pump and Stokes pulses, which propagate though respective pulse shapers that apply necessary time-dependent phases. To achieve complete overlap between the pulses in the time domain, necessary adjustments can be made by using an additional time delay line, which can be located one or both of the Stokes and pump optical paths.

Accordingly, an aspect of the invention is a method of performing a quantum gate from at least one qubit supported in a quantum register and having a qubit wave function. The method includes generating Stokes optical pulses along a first optical path and pump optical pulses along a second optical path. The method also includes selecting and shaping select Stokes pulses and pump pulses (e.g., via a "pulse picker") to form temporally overlapping chirped Stokes and pump pulses. The method also includes directing the chirped Stokes and pump pulses to a select one of the at least one qubit in a quantum register to manipulate the qubit wave function.

Another aspect of the invention is an apparatus for forming a quantum gate from at least one qubit having a wave function. The apparatus includes a quantum register configured to support the at least one qubit. The apparatus also includes a Stokes laser configured to generate Stokes light pulses and a pump laser configured to generate pump light pulses. The apparatus further includes means for forming overlapping, chirped Stokes and pump light pulses from the Stokes and pump light pulses generated by the Stokes and pump lasers. The apparatus also includes optical means for directing the overlapping, chirped Stokes and pump light pulses to a select one of the at least one qubit in the quantum register to manipulate the qubit wave function.

Another aspect of the invention is an apparatus for forming a quantum gate from at least one qubit having a wave function. The quantum gate apparatus includes a quantum register configured to support the at least one qubit. The apparatus also includes first and second synchronized lasers configured to generate initial Stokes and pump light pulses along respective first and second optical paths. The apparatus also includes first and second pulse pickers respectively arranged along the first and second optical paths and respectively configured to transmit select ones of the Stokes and pump light pulses. The apparatus also includes first and second pulse shapers respectively arranged along the first and second optical paths and respectively configured to impart either a positive or negative chirp to said select ones of the Stokes and pump light pulses from the respective first and second pulse pickers. The apparatus also includes first and second movable objective lenses respectively arranged along the first and second optical paths and respectively configured to receive the chirped Stokes and pump light pulses and direct said light pulses to a select one of the at least one qubit to manipulate the qubit wave function.

DETAILED DESCRIPTION OF THE INVENTION

The present invention is directed to apparatus for and methods of performing fast single-qubit quantum gates using ultrafast femtosecond frequency-chirped laser pulses. The use of chirped pulses removes the demanding restrictions mentioned above and allows for the construction of fast quantum gates that operate at speeds on the of order several picoseconds.

The most common method to implement quantum gates is based on the Rabi solution for a two-level quantum system excited by external field. There is a very simple reason for this choice. To construct a single-qubit quantum gate, one needs to know the exact form of the evolution operator of the qubit under the external field excitation. In the case of the Rabi solution, the evolution operator of the qubit has a very clear and easily interpreted form. In essence, the entire dynamics of the qubit is governed by the pulse area and, for example, in the resonance case, the evolution operator has simple form defined by an analytic solution of the Schröodinger equation.

Another important requirement for qubits in a quantum register is that the decoherence rate of the qubits should be small enough to allow many quantum operations. To make sure this is the case, the invention employs two lower lying levels having a long decoherence time as the qubit states. The qubits are externally addressed using a Raman excitation scheme through a third ancillary state. It is assumed that the ancillary state is far off the resonance with the external fields to ensure that decoherence can be neglected.

I. Theoretical Background

Figure 1:
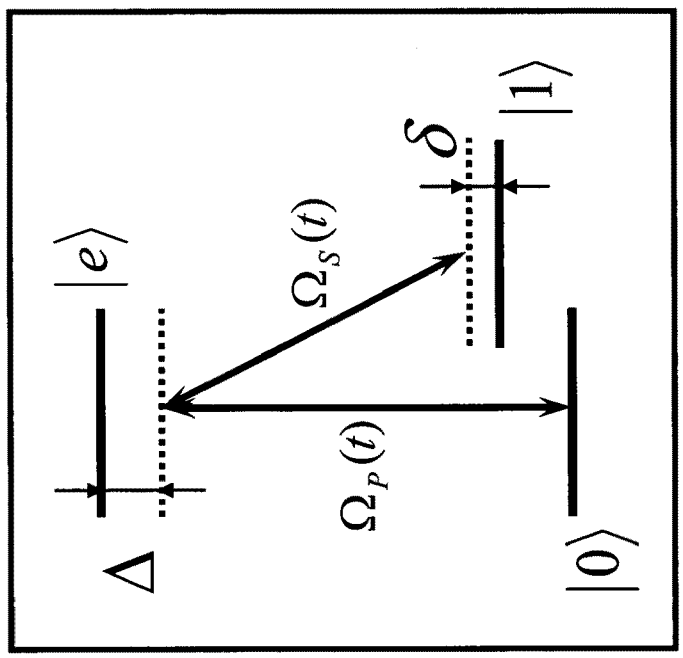
FIG. 1 is an energy level diagram of the energy structure of a three-level quantum system interacting with pump (P) and Stokes (S) pulses, with the two lowest levels representing the qubit states.

A single qubit in the form of, say an atom, ion or molecule, can be represented as a two-level system. In our case we have two quantum states $|0\rangle$ and $|1\rangle$ with energy $\epsilon_0$ and $\epsilon_1$ correspondingly while the ancillary state $|e\rangle$ has the energy $\epsilon_e$, as shown in the energy level diagram of FIG. 1. To manipulate in time by the total wave function of the quantum system $$|\Psi(t)\rangle = \alpha_0(t)|0\rangle + \alpha_1(t)|1\rangle + b(t)|e\rangle, \quad (0.1)$$

where $\alpha_{0,1}(t)$ and $b(t)$ are the probability amplitudes to be in state $|0\rangle$, $|1\rangle$ or $|e\rangle$, we use an external fields, which in general can be described as $$E_{1,2}(t) = E_{1,2}^{(0)}(t)\cos\phi_{1,2}(t), \quad (0.2)$$

where $E_{1,2}^{(0)}(t)$ are the field envelopes, $\phi_{1,2}(t)$ is the time-dependent phases.

We consider here the case of liner chirp so that $$\phi_{1,2}(t) = \phi_{1,2}^{(0)} + \omega_{1,2}^{(0)}t + \alpha_{1,2}\frac{t^2}{2}, \quad (0.3)$$

where $\phi_{1,2}^{(0)}$ is the initial phases, $\omega_{1,2}^{(0)}$ are the center frequencies, and $\alpha_{1,2}$ are the chirps of the pulses.

Applying the rotating wave approximation and assuming large detunings of the pump and Stokes field frequencies from the transition to the ancillary state, $\Delta$, we obtain the Schrödinger equation $$i\begin{pmatrix} \dot{a}_0(t) \\ \dot{a}_1(t) \end{pmatrix} = \left\{-\frac{1}{2}\left(\delta + (\alpha_2 - \alpha_1)t - \frac{\Omega_{p0}^2(t) - \Omega_{s0}^2(t)}{4\Delta}\right)\hat{\sigma}_z + \frac{\Omega_{p0}(t)\Omega_{s0}(t)}{4\Delta}\hat{\sigma}_x\right\}\begin{pmatrix} a_0(t) \\ a_1(t) \end{pmatrix}, \quad (0.4)$$

where $\Omega_{p0}(t)$, $\Omega_{s0}(t)$ are the Rabi frequencies, $\delta$ is the two-photon detuning, $\hat{\sigma}_{z,x}$ are the Pauli matrixes.

According to Eq. (1.4), it is clear that we can simplify the excitation scheme by choosing $\alpha_1 = \alpha_2 = \alpha$ and identical time-dependent Rabi frequencies, $\Omega_{p0}(t) = \Omega_{s0}(t) = \Omega_0(t)$. Thus we obtain $$i\begin{pmatrix} \dot{a}_0(t) \\ \dot{a}_1(t) \end{pmatrix} = \left\{-\frac{1}{2}\delta\hat{\sigma}_z - \Omega_e(t)\hat{\sigma}_x\right\}\begin{pmatrix} a_0(t) \\ a_1(t) \end{pmatrix}, \quad (0.5)$$

where $\Omega_e(t) = \Omega_{p0}(t)\Omega_{s0}(t)/(4\Delta) = \Omega_0^2(t)/(4\Delta)$ is the effective Rabi frequency.

The evolution operator of Eq. (0.5) for the resonant qubit, $\delta = 0$, is $$\hat{U}(t) = \begin{pmatrix} \cos S(t) & i\sin S(t) \\ i\sin(t) & \cos S(t) \end{pmatrix}, \quad (0.6)$$

where $$S(t) = \int_{-\infty}^{t} \Omega_e(t')dt'$$

is the effective pulse area.

We can use the Pauli matrix to rewrite $$\hat{U}(t) = e^{iS(t)\hat{\sigma}_x} \equiv R_x(S(t)). \quad (0.7)$$

Control of the effective pulse area S(t) gives us a way to design many single qubit gates that go between the identity and generalized NOT gates when S(t) changes from 0 to $\pi/2$. In particular, choosing $$\bar{S} = \int_{-\infty}^{\infty} \Omega_e(t')dt' = \pi/4$$

we obtain $$\hat{U}_{\pi/4} = \frac{1}{\sqrt{2}}\begin{pmatrix} 1 & i \\ i & 1 \end{pmatrix}, \quad (0.8)$$

which is the quantum $\sqrt{\text{NOT}}$ gate.

Using the quantum $\sqrt{\text{NOT}}$ gate we construct the following operation $$\hat{U}_{\pi/4}\hat{U}_{\varphi}\hat{U}_{\pi/4} = \frac{1}{\sqrt{2}}\begin{pmatrix} 1 & i \\ i & 1 \end{pmatrix}\begin{pmatrix} e^{i\varphi} & 0 \\ 0 & e^{-i\varphi} \end{pmatrix}\frac{1}{\sqrt{2}}\begin{pmatrix} 1 & i \\ i & 1 \end{pmatrix} \quad (0.9)$$

$$= i\begin{pmatrix} \sin\varphi & \cos\varphi \\ \cos\varphi & -\sin\varphi \end{pmatrix},$$

where $\hat{U}_\varphi$ is the phase gate.

It is straightforward to see the following decomposition of the Hadamard gate H:

$$H = e^{-i\pi/2}\hat{U}_{\pi/4}\hat{U}_{\varphi=\pi/4}\hat{U}_{\pi/4} \quad (0.10)$$

$$= -\frac{i}{\sqrt{2}}\begin{pmatrix} 1 & i \\ i & 1 \end{pmatrix}\begin{pmatrix} \frac{1+i}{\sqrt{2}} & 0 \\ 0 & \frac{1-i}{\sqrt{2}} \end{pmatrix}\frac{1}{\sqrt{2}}\begin{pmatrix} 1 & i \\ i & 1 \end{pmatrix}$$

$$= \frac{1}{\sqrt{2}}\begin{pmatrix} 1 & 1 \\ 1 & -1 \end{pmatrix}.$$

To construct a phase gate, we consider the off-resonant excitation of a qubit for two-photon detuning $\delta \neq 0$. For the off-resonant qubits, $\delta \neq 0$, in the adiabatic approximation the evolution operator is $$\hat{U}(t) = \frac{1}{\sqrt{2}}\begin{pmatrix} e^{i\xi(t)}\sqrt{1+\frac{\delta}{\sqrt{\delta^2+4\Omega_e^2(t)}}} & e^{-i\xi(t)}\sqrt{1-\frac{\delta}{\sqrt{\delta^2+4\Omega_e^2(t)}}} \\ e^{i\xi(t)}\sqrt{1-\frac{\delta}{\sqrt{\delta^2+4\Omega_e^2(t)}}} & e^{-i\xi(t)}\sqrt{1+\frac{\delta}{\sqrt{\delta^2+4\Omega_e^2(t)}}} \end{pmatrix}, \quad (0.11)$$

where $$\xi(t) = \frac{1}{2}\int_{-\infty}^{t}\sqrt{\delta^2+4\Omega_e^2(t')}\,dt'$$

is the effective pulse area.

We see from Eq. (0.11) that at the end of the pulses, when $\Omega_e(t) \to 0$, the evolution operator is the phase gate $$\hat{U}_{\varphi=\bar{\xi}} = \begin{pmatrix} e^{i\bar{\xi}} & 0 \\ 0 & e^{-i\bar{\xi}} \end{pmatrix}, \quad (0.12)$$

where $$\bar{\xi} = \frac{1}{2}\int_{-\infty}^{\infty}\sqrt{\delta^2+4\Omega_e^2(t')}\,dt'$$

is the phase defined by effective generalized Rabi frequency.

The Hadamard gate, Eq. (0.10), and the phase gate Eq. (0.12) constitute a complete universal set for quantum computing allows one to construct any single-qubit quantum gate, that is, any state of a qubit in the quantum register can be prepared using these two gates only.

Figures 2A, 2B:
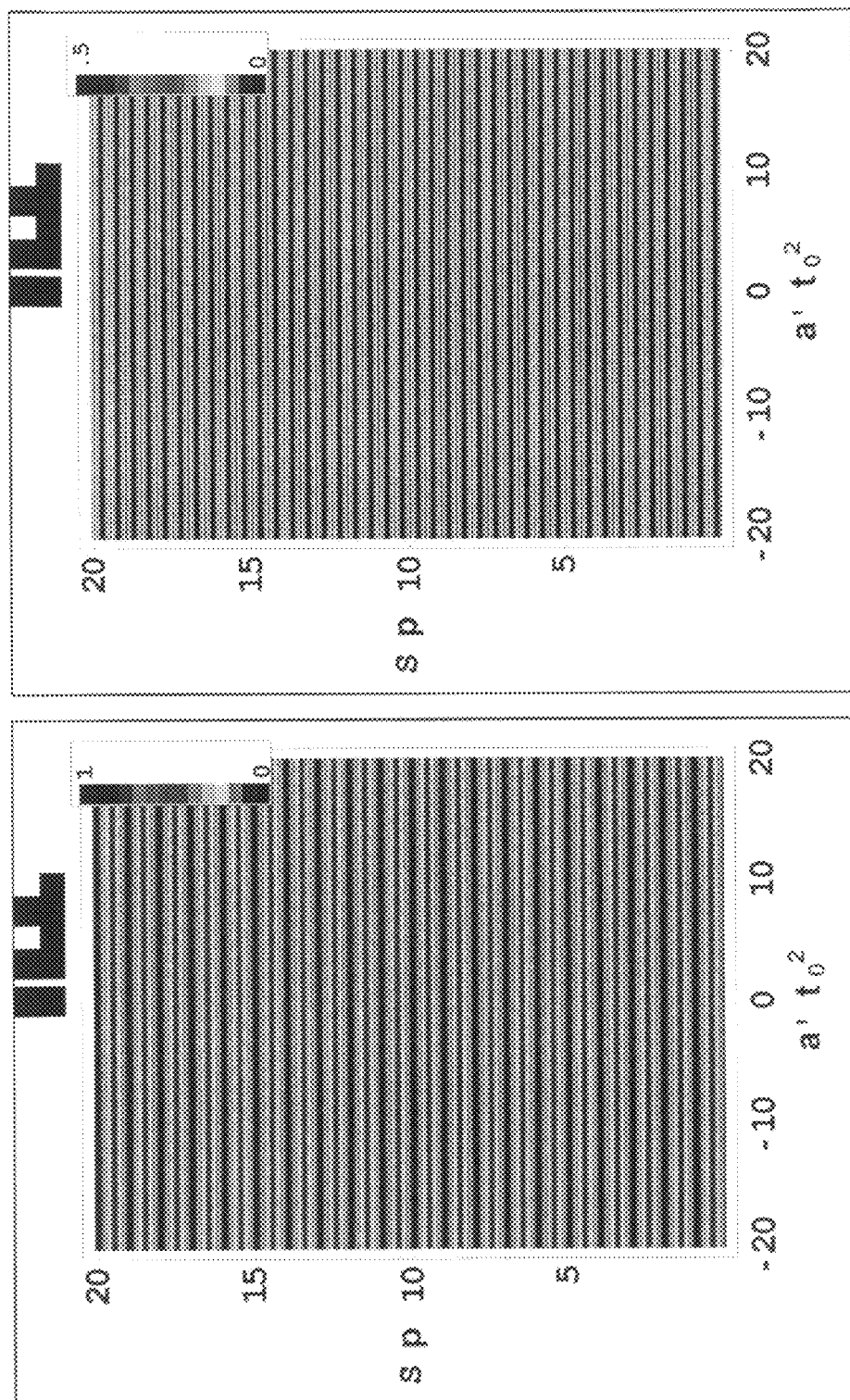
FIG. 2A and FIG. 2B are density plots of the ground state population (FIG. 2A) and coherence (FIG. 2B) for the resonant excitation of the qubit.
Figure 3B:
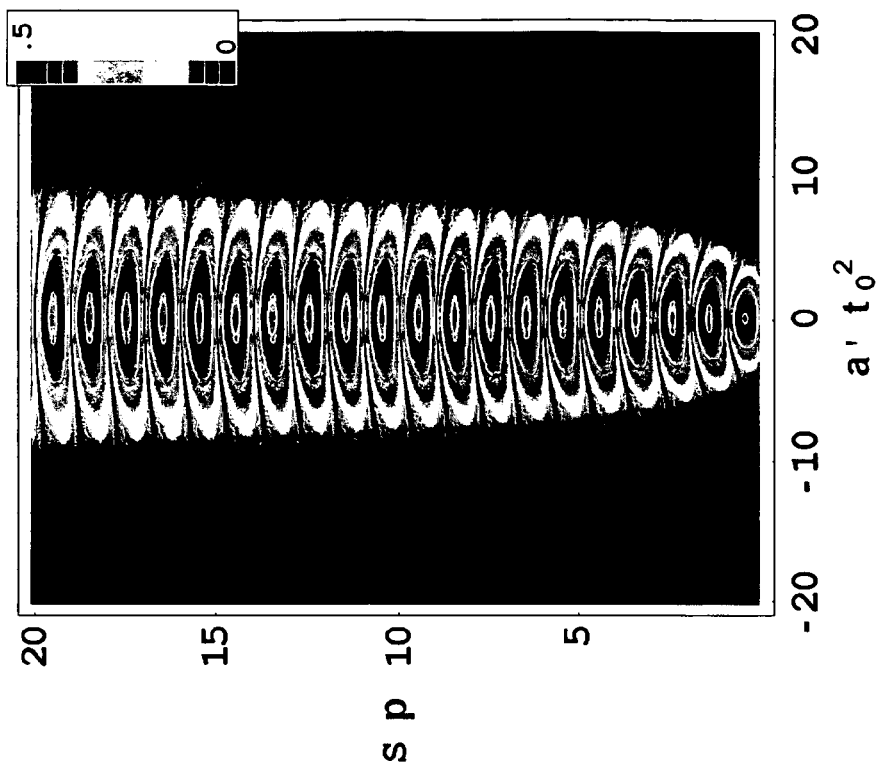
FIG. 3A and FIG. 3B are density plots of ground state population (FIG. 3A) and coherence (FIG. 3B) for the off-resonant excitation of the qubit.
Figure 3A:
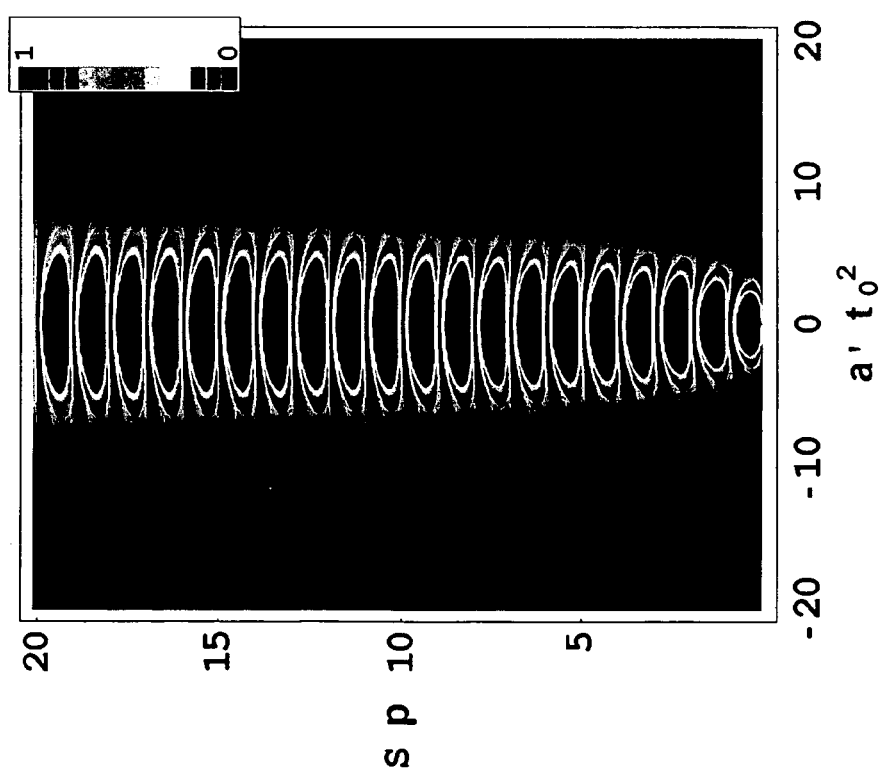

FIG. 2A,B and FIG. 3A,B show the population of the ground state $|0\rangle$ (FIGS. 2A and 3A) and coherence (FIG. 2B and 3B) as a function of the chirp rate and the effective pulse area for the resonant qubit and for off-resonant qubit, respectively. These plots confirm the conclusion based on the analytic analysis of the evolution operators Eq. (0.6) and Eq. (0.11).

For the resonant qubit, the Rabi oscillation is a function of the pulse area independent of the chirp rate. Independence from the chirp rate can be explained as follows. The resonant qubit dynamics are controlled by the effective pulse area, $$S(t) = \int_{-\infty}^{t}\Omega_e(t')dt',$$

which in turn is defined by the effective Rabi frequency, $\Omega_e(t)$, and the Rabi frequencies of pump and Stokes pulses depend on the corresponding chirp rates.

Using Eqs. (0.6) and (0.11), several quantum gates can be defined by choosing the proper values of the pulse chirps and the area of the pulses. Note that $\Omega_{p0}(t)$ and $\Omega_{s0}(t)$ depend on the chirp rates and thus provide a way to control nonadiabatic terms to satisfy the adiabaticity conditions. For the resonant qubit, $\delta=0$, the nonadiabatic terms are exactly zero and the dynamics of the qubit wave function are adiabatic. For the off-resonant qubit, $\delta \neq 0$, the nonadiabatic terms are not zero but can be controlled by adjusting the chirp rate.

Figure 4:
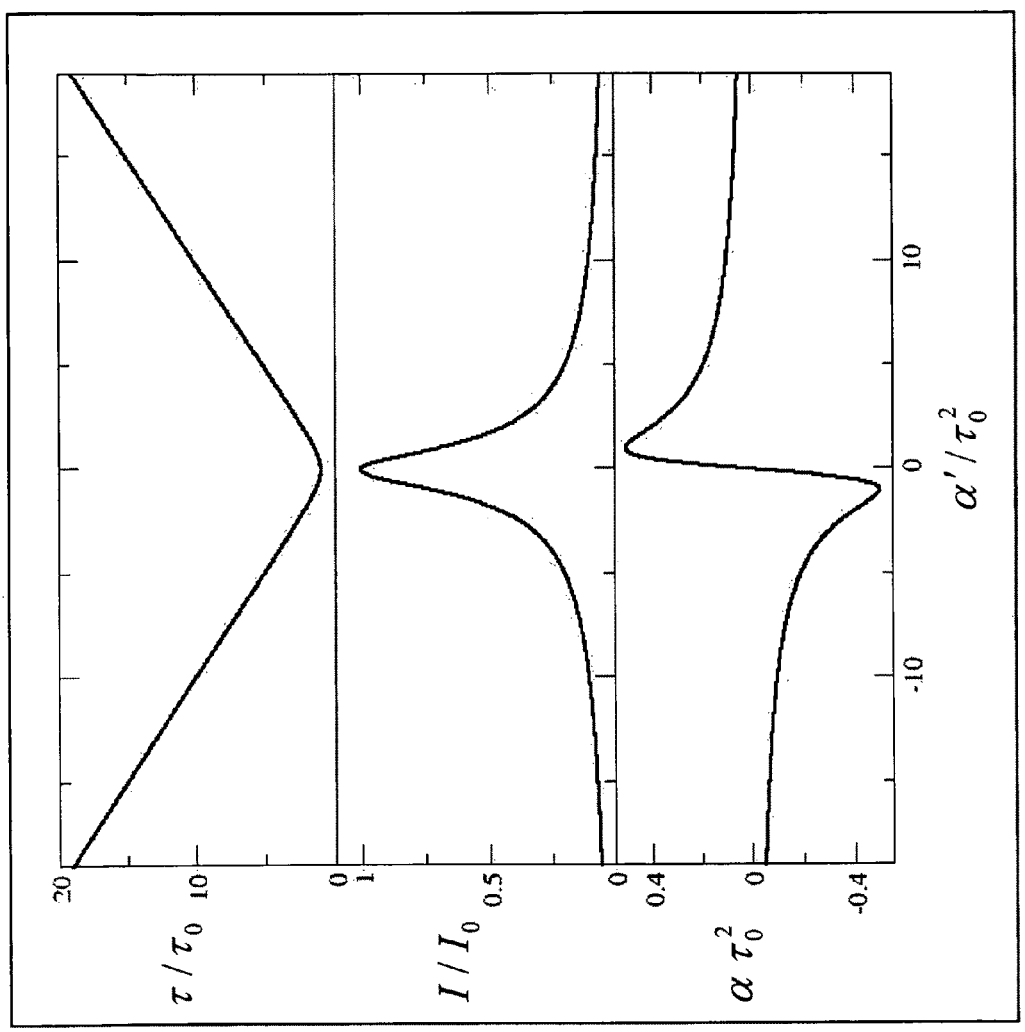
FIG. 4 plots the dependence of the pulse duration (upper frame), the intensity (middle frame) and the temporal chirp rate (lower frame) on the frequency chirp rate.

FIG. 4 plots dependence of the pulse duration ($\tau$), maximum pulse intensity (I) and temporal chirp rate ($\alpha$) on the frequency chirp ($\alpha'$), wherein the parameters are normalized using the duration of the transform-limited pulse ($\tau_0$). (see, e.g., V. S. Malinovsky and J. L. Krause, "General theory of population transfer by adiabatic rapid passage with intense, chirped laser pulses", *Eur. Phys. J. D*, V. 14, P. 147-155 (2001), which article is incorporated by reference herein). Increasing the frequency chirp makes the pulse longer in time and reduces its maximum intensity. This in turn makes nonadiabatic coupling smaller so that it can be neglected for a frequency chirp higher than a certain value, which allows the qubit wave function dynamics to be adiabatic. To obtain robust adiabatic pulse parameters, the initial transform-limited pulses have to be stretched by chirping by about 10 times or more (e.g., a 100 fs (femtosecond) pulse has to be stretched to several picoseconds) and the maximum pulse intensity needs to be on the order of $10^{10}$ W/cm$^2$ or higher.

II. Quantum Gate Apparatus

Figure 5:
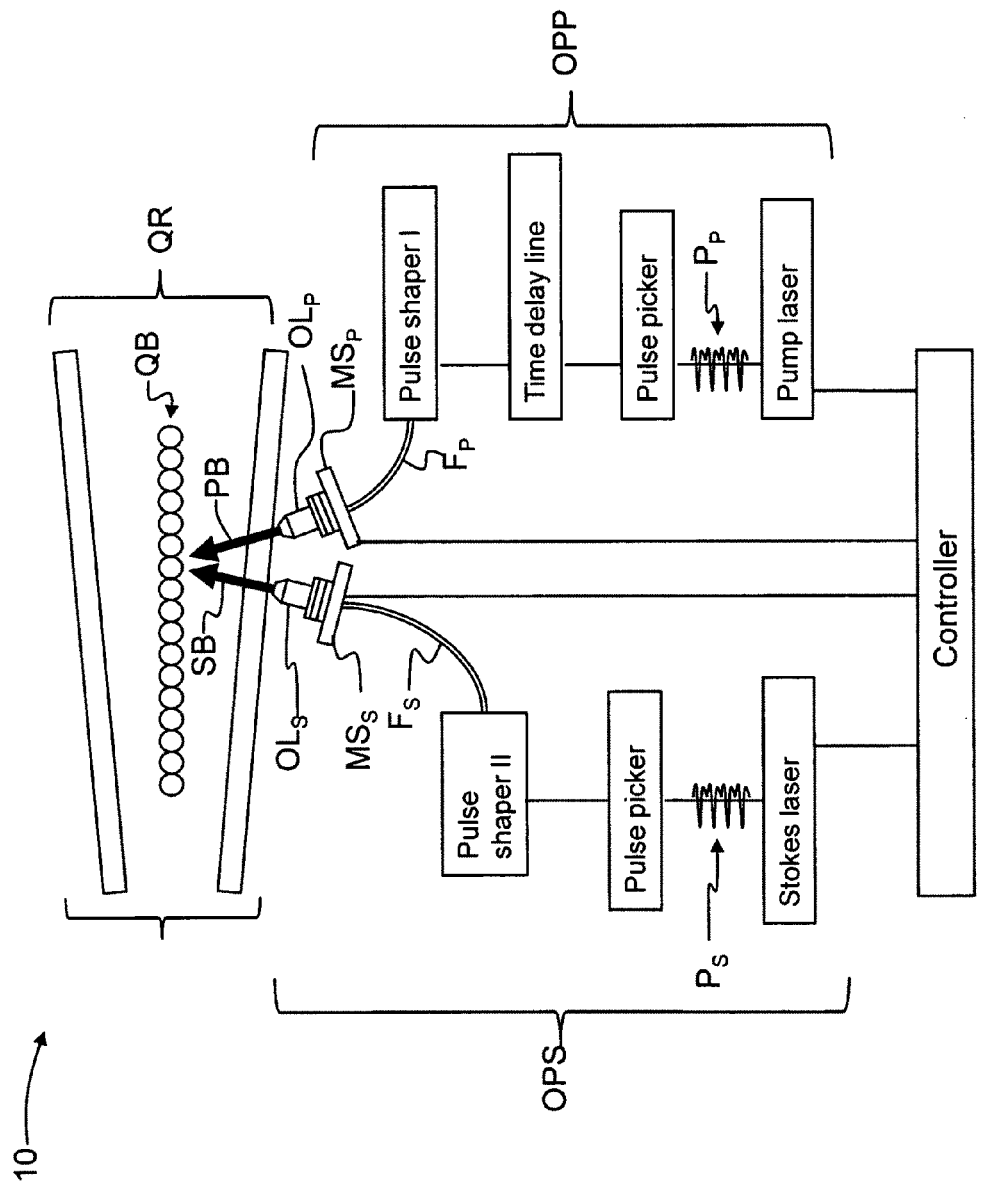
FIG. 5 is a schematic diagram of an example embodiment of the apparatus used to perform quantum gate operations.

The present invention includes methods of and apparatus for performing fast quantum gate operations using ultrafast strong laser pulses. FIG. 5 is a schematic diagram of an example embodiment of a quantum gate apparatus 10 according to the present invention. Apparatus 10 includes two synchronized lasers—a pump laser and a Stokes laser. A quantum register QR contains at least one qubit QB and preferably a plurality of qubits. In an example embodiment, quantum register comprises a "gradient trap" such as formed by applying gradient magnetic field to a spin-based qubits or by applying a gradient electric field to properly trapped polar molecules or ions that serve as the qubits.

Apparatus 10 includes a Stokes optical path OPS between the Stokes laser and the quantum register QR, and a pump optical path OPP between the pump laser and the quantum register QR.

Each laser generates a train of optical pulses, namely pump pulses $P_P$ and Stokes pulses $P_S$, respectively. Respective pulse pickers are arranged downstream of and relative to the pump and Stokes lasers in the respective optical paths OPS and OPP and are configured to choose select pump and Stokes pulses $P_P$ and $P_S$, which then propagate though respective pulse shapers I and II, where necessary time-dependent phases are applied to the respective pulses. Pulse pickers are devices that are configured (e.g., with a fast modulator) to pass a select pulse or pulses while blocking the remaining pulses. Pulse pickers are used because the Stokes and pump lasers typically are operated in a manner that generates a continuous train of pulses, and not all of the pulses are needed.

To achieve complete overlap between the pump and Stokes pulses in time domain, necessary adjustments can be made by using an additional time delay line, which can be located in any one path of the pump and Stokes optical paths, or in both optical paths.

Figure 6:
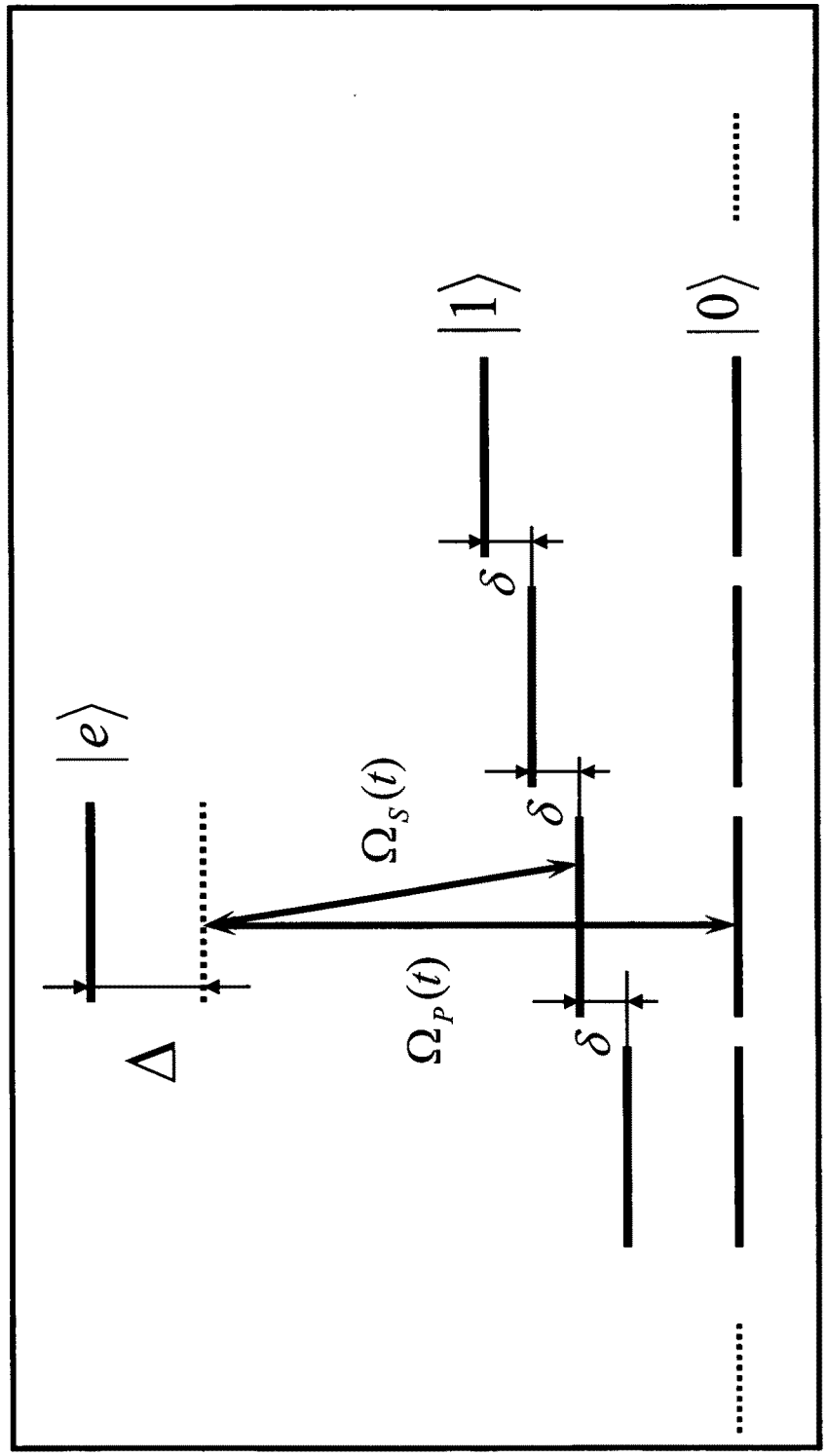
FIG. 6. is an energy level diagram of the energy structure of qubits a quantum register placed in a gradient field.

The prepared chirped pulses propagate through respective optical fiber sections $F_S$ and $F_P$ to a target one of one or more qubits QB operably supported in a quantum register QR. An energy structure diagram of the qubits QB in the quantum register QR of FIG. 5 is shown in FIG. 6. Objective lenses $OL_S$ and $OL_P$ situated on movable stages $MS_S$ and $MS_P$ are optically coupled to respective optical fiber sections $F_S$ and $F_P$ and are used to direct the Stokes and pump pulses to the target qubit QB in quantum register QR to manipulate the qubit wave function in a select manner. The objective lenses $OL_S$ and $OL_P$ can comprise one or more lens elements configured to focus the Stokes and pump beams onto a single qubit without substantially impacting any qubits immediately surrounding the select or target qubit.

The stages $MS_S$ and $MS_P$ are electronically connected to a controller and also can be rotated to select a target qubit QB in the quantum register QR. The controller is also operably connected to the Stokes and pump lasers and is configured to synchronize the operation of theses lasers in generating the Stokes and pump pulses $P_S$ and $P_P$.

Figure 7:
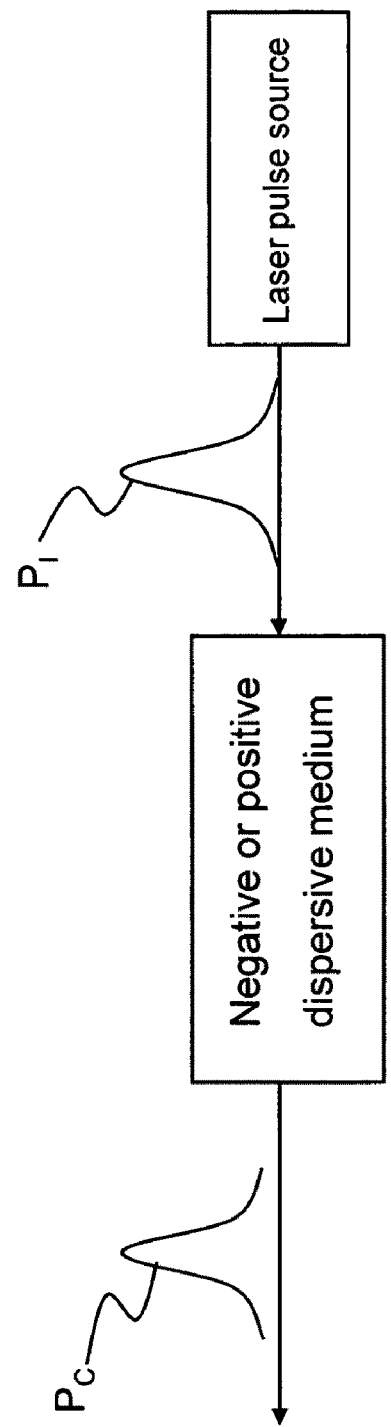
FIG. 7 is a general schematic of an example embodiment of a linear chirped pulse shaper apparatus.

FIG. 7 is a schematic diagram of an example embodiment of a pulse shaper apparatus according to the present invention.

Figure 8:
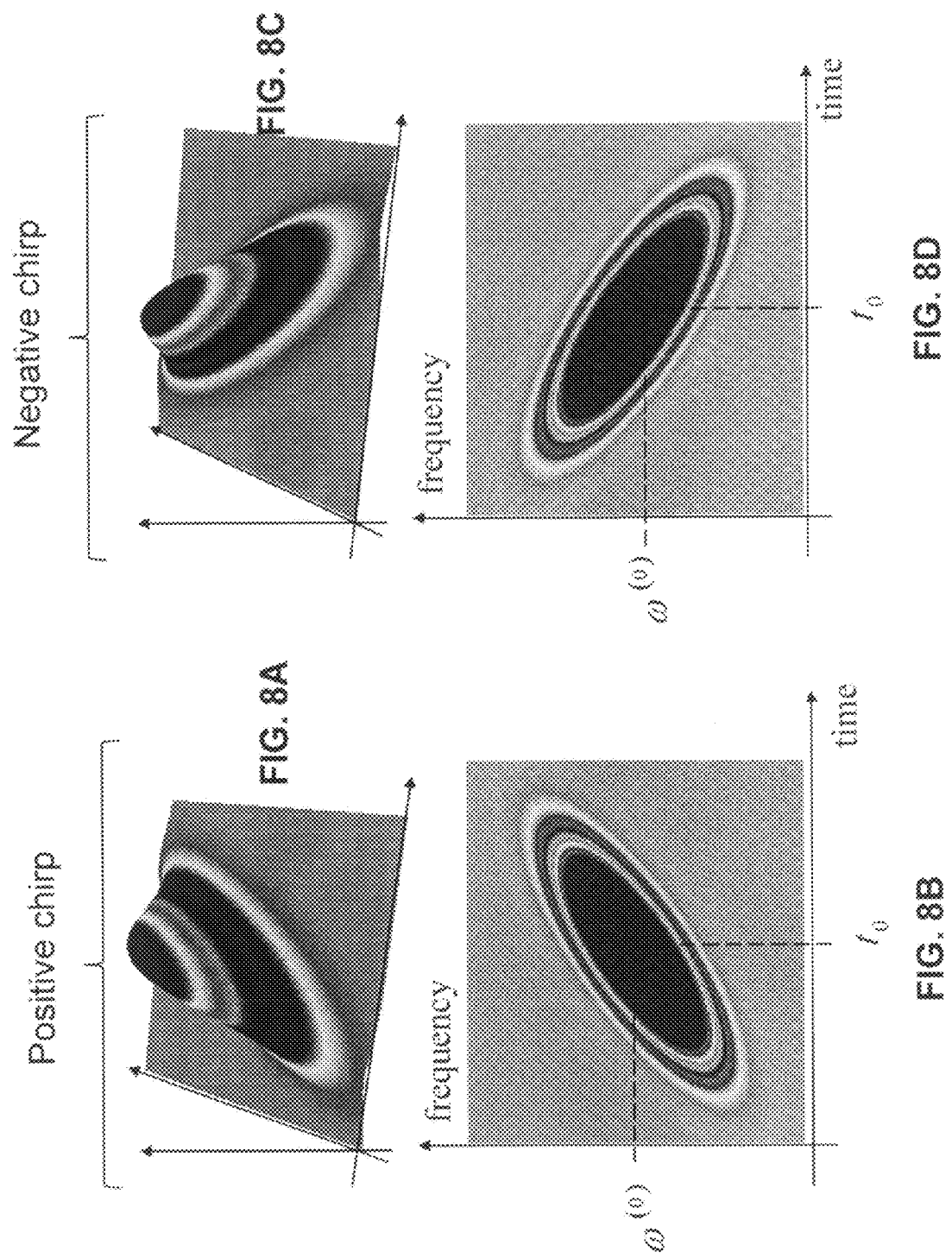
FIGS. 8A through 8D are plots of positive (8A and 8B) and negative (8C and 8D) chirped pulses, where plots 8A and 8C are Wigner plots and 8B and 8D are corresponding contour plots.

The general idea is to apply a positive chirp or a negative chirp to an input pulse $P_I$ by sending the input pulse from a laser pulse source through a dispersive medium having suitable dispersion (positive or negative). A Wigner representation of positive and negative chirped output pulses $_{PC}$ is shown in FIGS. 8A and 8B for a positive chirp and 8C and 8D for a negative chirp.

Figure 9:
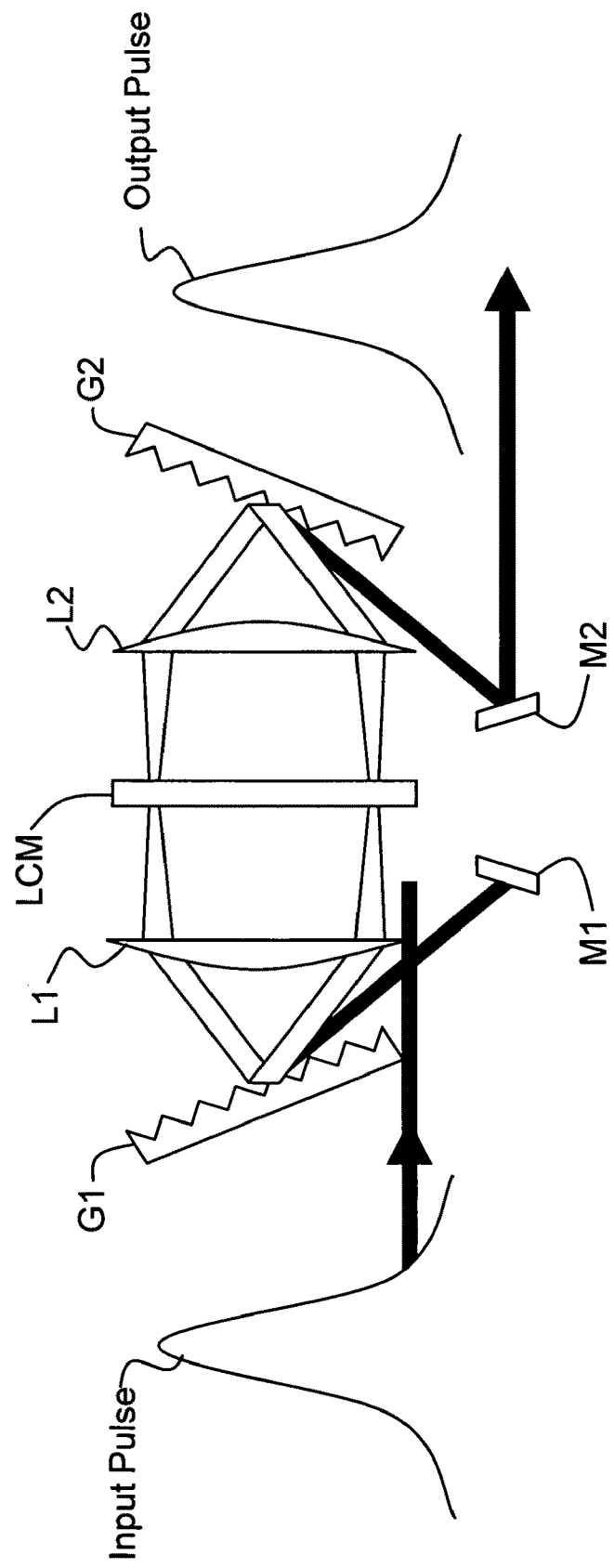
FIG. 9. is a schematic diagram of an example embodiment of a pulse shaper apparatus for use in the quantum gate apparatus of FIG. 5.
Figure 10:
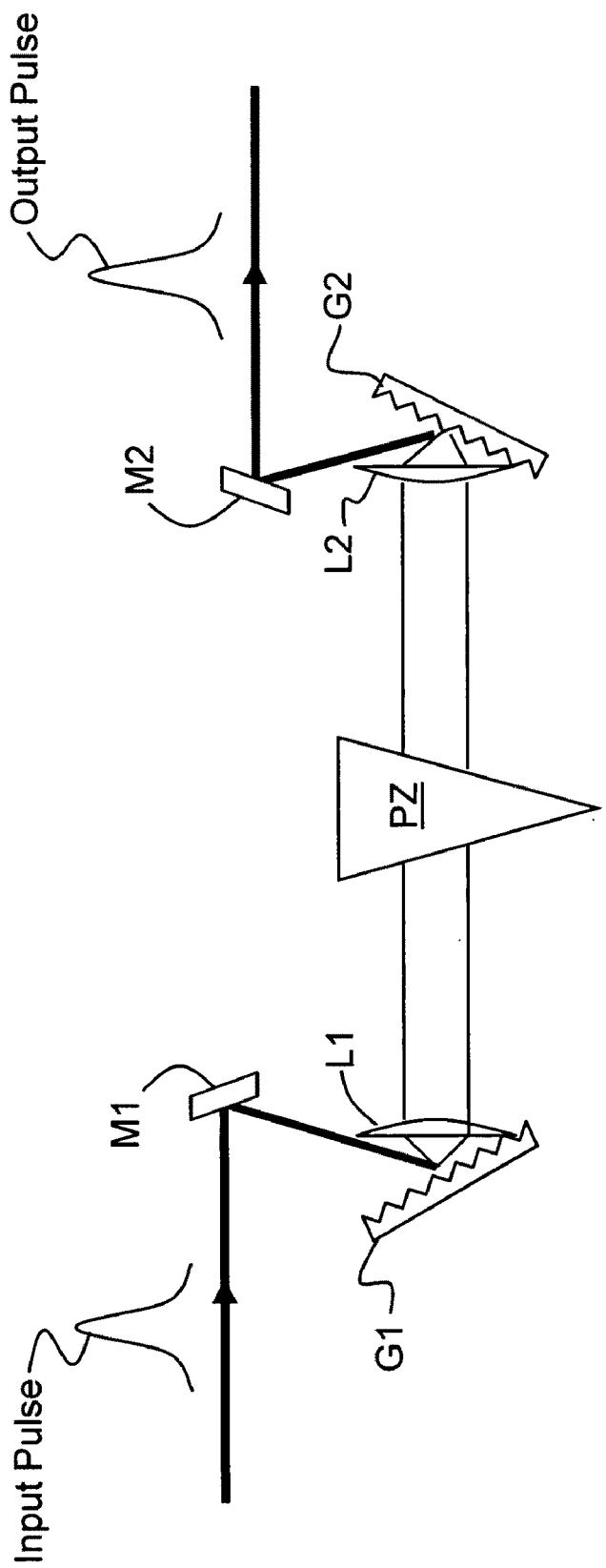
FIG. 10 is a schematic diagram of an example embodiment of a pulse shaper apparatus that uses a prism.

A schematic diagram of another example embodiment of a pulse shaper used in FIG. 5 is shown in FIG. 9. A chirp is applied to a transform-limited input pulse by using two gratings G1 and G2, and two lenses L1 and L2, and controlling the voltage applied to each pixel in a liquid-crystal mask or modulator LCM as the dispersive element to produce the shaped output pulse. Select amounts of dispersion are imparted to select frequency components of the pulse. Fold mirrors M1 and M2 are used to form the grazing-incidence angles with gratings G1 and G2, respectively. A linear chirp (positive or negative) can be obtained using a prism PZ placed inside of the pulse-shaper, as shown in FIG. 10.

Figure 11:
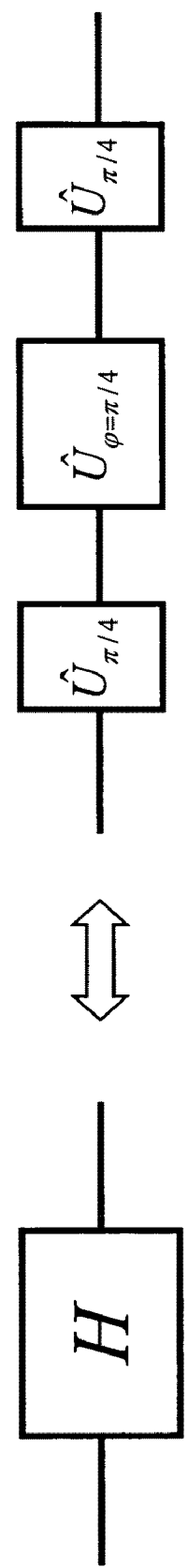
FIG. 11 is a block diagram of a Hadamard quantum gate.

FIG. 11 shows block diagram of implementing a Hadamard quantum gate that contains two quantum $\sqrt{NOT}$ gates and one $\pi/4$ phase gate. The control parameters are the amplitude of the pulses and two-photon detuning. Two-photon detuning is accomplished by changing the laser frequency of the pump and Stokes pulses, while the amplitude of the pulses is selected by changing the frequency chirp.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of performing a quantum gate from at least one qubit supported in a quantum register and having a qubit wave function, comprising:
    generating Stokes optical pulses along a first optical path and pump optical pulses along a second optical path;
    selecting and shaping select Stokes pulses and pump pulses to form temporally overlapping chirped Stokes and pump pulses; and
    directing the chirped Stokes and pump pulses to a select one of the at least one qubit in a quantum register to manipulate the qubit wave function.

2. The method of claim 1, further including shaping the select Stokes and pump pulses using first and second pulse shapers arranged in the first and second optical paths, respectively, wherein each pulse shaper includes a dispersive medium.

3. The method of claim 1, further comprising forming the quantum register from a gradient trap and the at least one qubit comprising at least one ion or at least one molecule.

4. The method of claim 1, including forming negatively chirped pump and Stokes pulses.

5. The method of claim 1, including forming the Stokes and pump pulses from first and second lasers operably coupled to and controlled by a controller configured to synchronize the Stokes and pump pulses.

6. The method of claim 1, including directing the chirped Stokes and pump pulses to the select qubit using first and second objective lenses.

7. The method of claim 6, further including moving the objective lenses so as to direct the Stokes and pump pulses to the select qubit.

8. The method of claim 1, including forming the chirped Stokes and pump pulses by dispersing each of the pulses by a diffraction grating and then to a dispersive element configured to impart select amounts of dispersion to select pulse frequencies.

9. The method of claim 8, wherein the dispersive element is a liquid crystal modulator.

10. The method of claim 8, wherein the dispersive element is a prism.

11. The method of claim 1, further comprising forming a Hadamard gate that contains two quantum $\sqrt{NOT}$ gates and one $\pi 4$ phase gate.

12. An apparatus for forming a quantum gate from at least one qubit having a wave function, comprising:
a quantum register configured to support the at least one qubit;
a Stokes laser configured to generate Stokes light pulses and a pump laser configured to generate pump light pulses;
means for forming overlapping, chirped Stokes and pump light pulses from the Stokes and pump light pulses from the Stokes and pump lasers; and
optical means for directing the overlapping, chirped Stokes and pump light pulses to a select one of the at least one qubit to manipulate the qubit wave function.

13. The apparatus of claim 12, wherein the quantum register includes a gradient trap.

14. The apparatus of claim 12, further comprising a controller operably coupled to the Stokes and pump lasers and configured to control the generation and synchronization of the Stokes and pump light pulses.

15. The apparatus of claim 12, wherein the qubits are spin −1/2 qubits.

16. An apparatus for forming a quantum gate from at least one qubit having a wave function, comprising:
a quantum register configured to support said at least one qubit;
first and second synchronized lasers configured to generate initial Stokes and pump light pulses along respective first and second optical paths;
first and second pulse pickers respectively arranged along the first and second optical paths and respectively configured to transmit select ones of the Stokes and pump light pulses;
first and second pulse shapers respectively arranged along the first and second optical paths and respectively configured to impart either a positive or negative chirp to said select ones of the Stokes and pump light pulses from the respective first and second pulse pickers; and
first and second movable objective lenses respectively arranged along the first and second optical paths and respectively configured to receive the chirped Stokes and pump light pulses and direct said light pulses to a select one of the at least one qubit to manipulate the qubit wave function.

17. The apparatus of claim 16, wherein the quantum register comprises a gradient trap.

18. The apparatus of claim 16, wherein at least one of the first and second pulse shapers comprises first and second diffraction gratings and a dispersive element.

19. The apparatus of claim 18, wherein the dispersive element comprises one of a prism and a liquid crystal modulator.

20. The apparatus of claim 16, wherein the initial Stokes and pump pulses are transform limited, and wherein said first and second pulse shapers are configured to stretch the initial transform-limited Stokes and pump pulses via chirping by about 10 times or greater.

* * * * *